3,441,617
OXIDATION OF AROMATIC COMPOUNDS
William G. Lloyd, Dover, N.J., assignor to The Lummus Company, Bloomfield, N.J., a corporation of Delaware
No Drawing. Filed Mar. 15, 1966, Ser. No. 534,419
Int. Cl. C07c 39/04, 39/14, 39/00
U.S. Cl. 260—621         12 Claims

ABSTRACT OF THE DISCLOSURE

A process for directly oxidizing an aromatic compound having one unsubstituted position on the aromatic nucleus, such as benzene, to produce the corresponding aromatic alcohol having the hydroxy group on the aromatic nucleus wherein the aromatic compound is contacted with an alcohol, such as ethylene glycol, in the presence of a noble metal compound of Group VIII of Mendeleeff's Periodic Table, such as palladium chloride. The process may be effected in the presence of a redox promoter, such as copper chloride.

---

This invention has to do with a catalytic process for oxidizing aromatic compounds to their corresponding phenolic compounds. More specifically, the invention relates to a process for oxidizing aromatic compounds in liquid phase by contacting the compounds with hydroxyl compounds in the presence of catalytic amounts of noble metal compounds of Group VIII of Mendeleeff's Periodic Table.

Direct oxidation of aromatic compounds to the corresponding phenols has been a long sought goal. Presently available processes require costly reagents or processing techniques. Furthermore, severe reaction conditions and multi-step processes, which result in poor yields, are required. These two economic liabilities have frustrated many efforts to convert, for example, benzene directly to phenol. Examples of present practice are principally of indirect conversions. That is, chlorination or sulfonation of benzene followed by high temperature treatment with caustic. And the most widely practiced route to phenol requires alkylation of benzene to form, for example, cumene followed by oxidation to a hydroperoxide followed, in turn, by rearrangement of the hydroperoxide to the desired phenol and an equimolar amount of a carbonyl compound, such as acetone.

Although several techniques have been proposed hitherto for direct conversion of benzene to phenol, they have been characterized by a variety of shortcomings, among which are included: unsatisfactory conversion and/or yield, excessive by-products such as diphenyl and oxidation products, and equipment failures particularly in combustion techniques.

The present invention, thus, is directed to a new process for direct conversion of aromatic compounds to their corresponding phenolic compounds, the process being characterized by excellent selectivity and yields.

It is an object of the present invention, therefore, to provide a process for the direct conversion of aromatic compounds to phenolic compounds. Another object of the invention is to provide a selective catalytic process for such conversion. A particular object is to provide a process for converting benzene to phenol. Other objects of the invention will be apparent from the following description.

In accordance with the present invention, there is provided a process for oxidizing an aromatic compound having at least one unsubstituted position on the aromatic nucleus to the corresponding phenolic compound, which comprises: contacting the aromatic compound and a hydroxyl compound in the liquid phase, in the presence of a catalytic amount of a noble metal compound of Group VIII of Mendeleeff's Periodic Table.

In this process, a promoter capable of changing the valence of the noble metal to a higher valence state is generally included.

The hydoxyl compounds, noble metal compounds and promoters suitable for use herein are described in detail in my related copending applications to which reference can be made for such details. The applications are serial numbers: 391,005, filed Aug. 20, 1964; 474,460, 474,461, and 474,506, all filed July 23, 1965; and 517,981, filed Jan. 3, 1966. Such details are incorporated by reference into the present application.

Additionally, small amounts of acids can be used in the reaction system. So, too, solvents can be used with a hydroxyl compound. Such features are also detailed in the aforementioned related applications, to which reference is made. In the same vein, inhibitors disclosed in application Serial No. 517,981 can also be included herein.

By way of illustration as indicated in the above-mentioned related copending applications, the hydroxyl compounds are primary and secondary, monohydric and polyhydric alcohols, such as, alkanols having 1 to 6 carbon atoms; e.g., methyl-, ethyl-, propyl-, n-, t-, i-butyl, pentyl and hexyl, alcohol, alkane diols having 2 to 6 carbon atoms; such as, ethane diol, propane diols, butane diols, and hexane diols; ethylene chlorohydrin; benzyl alcohol, glycerine, pentaerythritol, sorbitol, mannitol and the like.

Compounds of noble metals of Group VIII of Mendeleeff's Periodic Table are used in catalytic amount. Typical of such metals, are palladium, rhodium and platinum. Anions associated with the metal can be of a wide variety, with halides being preferred.

The noble metal compound is preferably used with a promoter having an oxidation potential sufficient to change the valence of the noble metal from a lower to a higher valence state, commonly called a redox promoter.

Typical of such redox promoters are compounds of metals having various oxidation stages, namely compounds of copper, silver, mercury, iron, cobalt, etc. Anions associated with the metals can be of wide variety including halides, nitrates, acetates, ferrocyanides, benzoates, cyanides, thiocyanates and citrates, with preference being accorded to halides and, particularly, to chlorides. Representative of such promoters are: cupric chloride, bromide, fluoride, acetate, citrate, acetylacetonate, benzoate, ferrocyanide, and nitrate; cuprous iodide, thiocyanate, and cyanide; ferric and ferrous chlorides; mercuric chloride; cobaltous chloride; and silver acetate. The redox promoter may also be an organic redox promoter such as benzoquinone or chloranil. Oxygen can also be considered a promoter in the process, wherein it can be used with a noble metal compound and with or without one or more of the other promoters referred to above.

Aromatic compounds suitable for use in the new process include: benzene, toluene, xylenes, ethyl benzene, nonyl benzene, naphthalene, methyl naphthalenes, diphenyl, diphenyl ether, anisole, chlorobenzene, nitrobenzene, benzoic acid, benzonitrile, phenol and ethyl benzoate. Accordingly, the aromatic compounds are those having at least one unsubstituted position on the aromatic nucleus. Benzene is particularly preferred.

Proportions of the compounds used in the present process can be varied widely. However, at least about 2 molar proportions of a hydroxyl compound are used for each molar proportion of aromatic compound. Preferred ratios are 5:1 to 50:1. Catalytic amounts of metal compound (Group VIII metal) will generally be from about 1:3 to about 1:300 molar proportion, based upon the aromatic compound. The molar ratio of promoter, as cupric chloride, to Group VIII metal is from about 1:1 to about 100:1. Oxygen pressure is generally from atmospheric to about 500 pounds per square inch gauge (p.s.i.g.).

Reaction temperatures used in the present process are generally below 250° C., and preferably between about 75° C. and about 150° C.

The following examples illustrate the invention and serve to distinguish it from related techniques. It is to be understood, however, that the invention is not to be construed as limited to the particular materials and conditions recited therein.

EXAMPLE 1

A solution of 10 volume percent benzene in ethylene glycol was charged to an autoclave. Palladium chloride (7 grams/liter) and $CuCl_2 \cdot 2H_2O$ (17 grams/liter) were added. The autoclave was heated for one hour at 110° C., under a pressure of 3–6 atmospheres of oxygen. The autoclave was cooled and the resulting reaction product was discharged therefrom. Phenol was recovered from the reaction product in a yield in excess of about 80 percent by weight, at a conversion of about two percent per pass based upon benzene charge.

EXAMPLE 2

A mixture of benzene (10% by volume) and ethylene glycol was stirred vigorously in an autoclave at 110° C. for one hour. Examination of the resulting mixture by gas chromatograph revealed benzene as the sole aromatic compound even when the mixture had been sparged with oxygen.

The foregoing procedure was repeated with the exception of including 0.05 mole per liter of palladium chloride ($PdCl_2$) in the mixture. A gas chromatograph revealed the presence of only two aromatic materials, namely, phenol and benzene.

It is to be understood that many modifications may be made within the scope of the present invention without departing from the spirit thereof, and the invention is intended to include all such modifications.

What is claimed is:

1. A process for oxidizing an aromatic compound selected from the group consisting of benzene, toluene, xylenes, ethyl benzene, nonyl benzene, naphthalene, methyl naphthalenes, diphenyl, diphenyl ether, anisole, chlorobenzene and phenol to the corresponding phenolic compound, comprising: contacting the aromatic compound with an alcohol selected from the group consisting of alkanols having 1 to 6 carbon atoms; alkane diols having 2 to 6 carbon atoms, ethylene chlorohydrin, benzyl alcohol, glycerine, pentaerythritol, sorbitol and mannitol, in the liquid phase in the presence of a catalytic amount of a noble metal compound of Group VIII of Mendeleeff's Periodic Table at a temperature of up to about 250° C.

2. The process as defined in claim 1 wherein the noble metal compound is a palladium compound.

3. The process as defined in claim 2 wherein the alcohol is an alkane diol having 2 to 6 carbon atoms.

4. The process as defined in claim 2 wherein the alcohol is an alkanol having 1 to 6 carbon atoms.

5. The process as defined in claim 2 wherein the contacting is effected in the presence of oxygen and a redox promoter.

6. The process as defined in claim 5 wherein the palladium compound is palladous chloride.

7. The process as defined in claim 1 wherein the aromatic compound is benzene.

8. The process as defined in claim 7 wherein the noble metal compound is palladous chloride.

9. The process as defined in claim 8 wherein the contacting is effected in the presence of oxygen and a redox promoter.

10. The process as defined in claim 9 wherein the alcohol is an alkanol having 1 to 6 carbon atoms.

11. The process as defined in claim 9 wherein the alcohol is an alkane diol having 2 to 6 carbon atoms.

12. The process as defined in claim 1 wherein the aromatic compound is benzene, the noble metal compound is palladous chloride, the alcohol is ethylene glycol and the contacting is effected in the presence of oxygen and a redox promoter selected from the group consisting of cupric chloride and cupric nitrate.

References Cited

UNITED STATES PATENTS

Re. 24,848   7/1960   Kaeding et al. _____ 260—621

LEON ZITVER, *Primary Examiner.*

H. ROBERTS, *Assistant Examiner.*

U.S. Cl. X.R.

260—613, 623, 624, 620, 521, 473, 465